DETECTOR CIRCUIT

Filed Dec. 10, 1957

INVENTOR.
Harry Thanos
BY Donald W. Phillips
HIS ATTORNEY

Sept. 8, 1959 H. THANOS 2,903,585

DETECTOR CIRCUIT

Filed Dec. 10, 1957 2 Sheets-Sheet 2

INVENTOR.
Harry Thanos
By Donald W. Phillion
HIS ATTORNEY

United States Patent Office 2,903,585

Patented Sept. 8, 1959

2,903,585

DETECTOR CIRCUIT

Harry Thanos, Elmhurst, Ill., assignor to Admiral Corporation, Chicago, Ill., a corporation of Delaware Application December 10, 1957, Serial No. 701,896

6 Claims. (Cl. 250—27)

This invention relates, generally, to triode detectors, and more particularly to detectors employing triodes which will operate at near maximum efficiency for weak, medium, or strong signals.

In the prior art, detectors, employing triodes were not used in television receivers because they could not be made to operate satisfactorily over a sufficiently wide range of signal strengths. The principal reason for this inadequacy of triode detectors is due to the fact that in order to obtain near maximum operating efficiency, the magnitude of the plate voltage and control grid voltage must be varied as the strength of the input signal varies. On the other hand, it is well known that diode detectors exhibit near maximum efficiency over a large range of signal strengths with a constant plate voltage.

However, it occurs frequently that diode detectors actually employ a triode tube, but with the control grid connected to the plate. It is apparent that if the triode tube could be used as a triode rather than as a diode, the detector could be made to function as an amplifier as well as a detector.

An object of the present invention is to provide a triode detector which will perform efficiently the function of amplification, as well as the function of detection.

Another object of the invention is to eliminate one stage of amplification from television receivers.

A third purpose of the invention is to decrease the expense of television receivers.

A fourth aim of the invention is the improvement of detectors, generally.

In the development of this invention it was ascertained that with a detector employing a triode, as the strength of the input signal supplied to the triode increased, the potential of the triode plate also had to be increased to handle efficiently the increased signal strength. However, as the plate potential was increased, distortion resulted, unless the grid bias also was increased. Consequently, the grid bias was increased. The variations of plate voltage and grid bias with changes in signal strength necessary to minimize distortion was determined experimentally. In accordance with the intention there is provided means for producing a variable plate supply voltage whose magnitude increases or decreases as the strength of the signal supplied to the control grid increases or decreases, and circuit means such as a voltage divider for supplying a portion of said plate supply voltage to the cathode of said triode.

In accordance with a feature of the invention, the variable plate supply voltage can be produced by employing in series arrangement with a D.-C. voltage supply and the plate of the triode, a non-linear resistor whose magnitude varies inversely as the current therethrough. The variation of said non-linear resistor is such that as the plate current increases with an increase of signal strength, the voltage drop across the non-linear resistor will decrease, thus increasing the plate voltage.

The above-noted, and other objects and features of the invention, will be more fully understood from the following detailed description thereof, when read in conjunction with the drawings, in which.

It is to be noted that in the following description of the invention corresponding circuit elements in Fig. 1 and Fig. 2 are identified by the same reference characters (although primed in Fig. 2).

Figure 1:
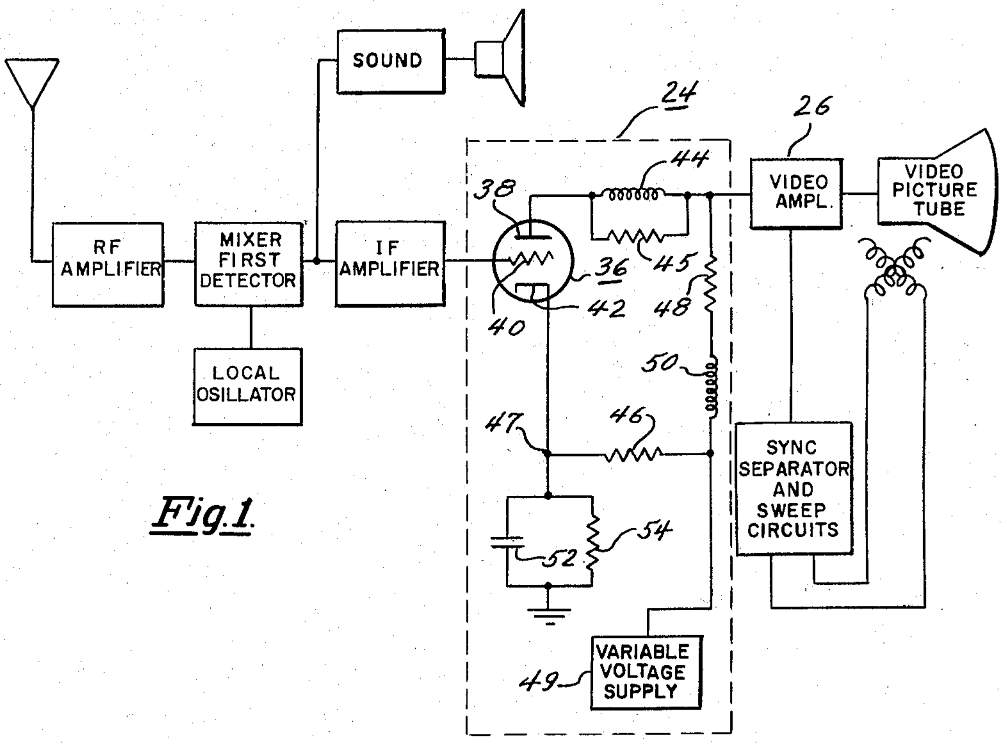
Fig. 1 is a combination block diagram and schematic sketch of a television receiver, with the invention represented by the schematic sketch portion.

Referring now to Fig. 1, the block diagram portion of the circuit is well known in the art and is included only to show how the invention fits into an overall television receiver system. A description of a similar block diagram can be found in almost any good text on television circuits, such as, for example, Chapter 8 of the first edition of "Television Receivers" by Bernard Grob, published in 1949 by the McGraw-Hill Book Co., Inc., and hereby incorporated herein as apart of this specification.

The invention comprises the structure within the dotted rectangle 24 and includes the triode 36 which, in cooperation with the associated circuitry within the block 24, functions both as a detector and as an amplifier for the detected signal. The coil 44 and the resistor 45, in combination with the capacitances of the tube 36 and the video amplifier 26, form a shunt peaking circuit. Coil 50 is a series peaking coil. As is well known in the prior art, the use of the combination of a series peaking coil and a shunt peaking coil provides more gain than the use of either by itself.

The resistors 46 and 54, together with the source of plate potential 49, form the essence of the invention. It will be noted that, because of the voltage divider formed by resistors 46 and 54, the potential difference between the cathode 42 and the control grid 40 of triode 36 will vary as the magnitude of the plate supply potential. More specifically, as the plate supply potential decreases, the potential at the point 47 will decrease, thus in effect decreasing the bias potential on the grid 40. On the other hand, if the plate supply potential increases, the potential of the point 47 will increase, thus in effect increasing the bias potential on the grid 40.

As stated hereinbefore, it has been found that to maintain a triode amplifier operating near maximum efficiency, it is necessary to vary the magnitude of the plate voltage as the magnitude of the strength of the incoming signal varies. Also, as indicated hereinbefore, in order to avoid the distortion that would otherwise occur with changes in plate voltage, the magnitude of the bias on the control grid should be varied as the magnitude of the plate potential varies.

Figures 3, 4:
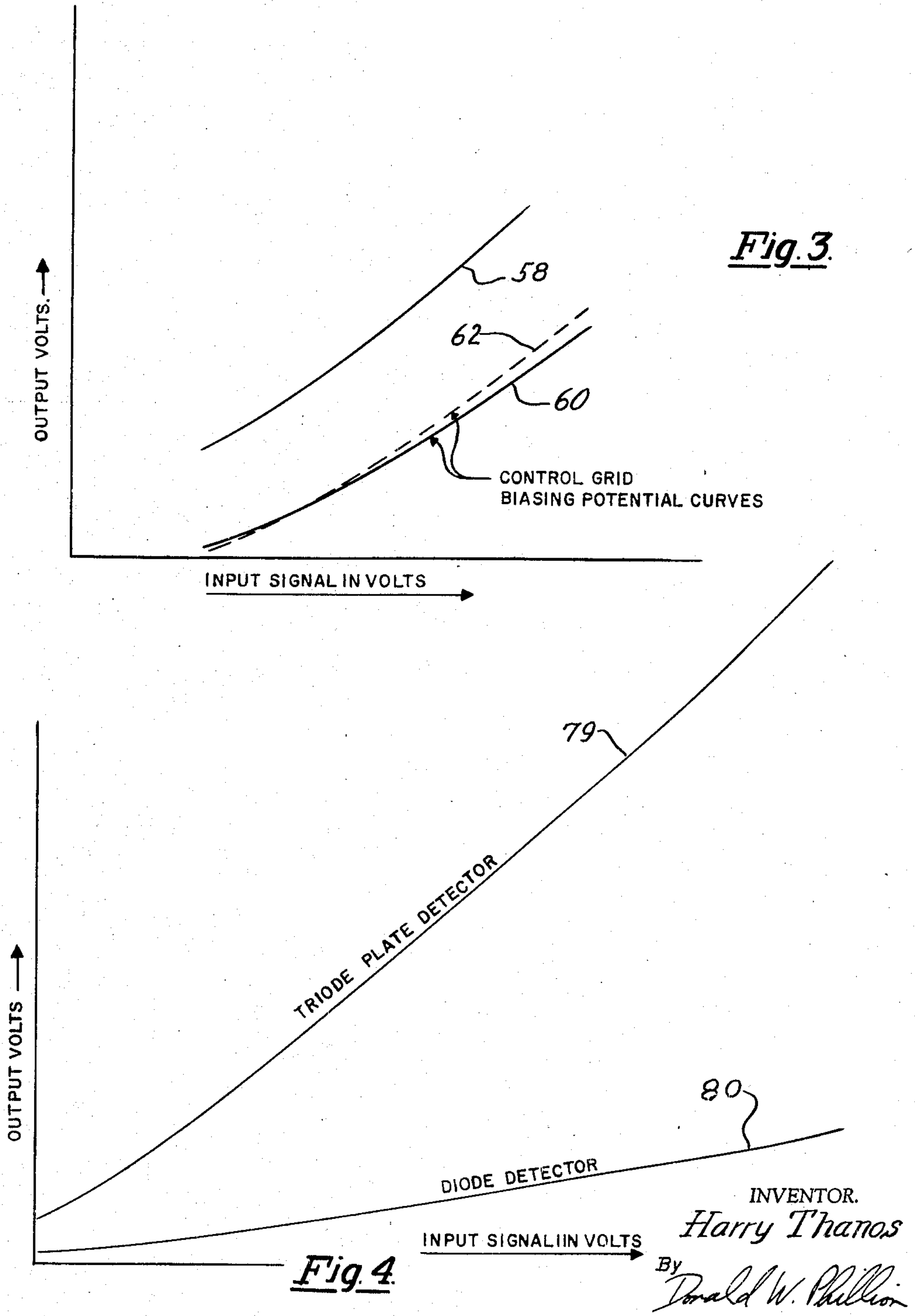
Fig. 3 shows curves of optimum plate voltages and grid voltages for input signals of different strengths.
Fig. 4 shows the relative gain characteristics of triodes versus diodes.

Referring now to the curves of Fig. 3, a comparison can be made of the experimentally determined ideal changes in plate 38 voltage and grid 40 biasing voltage for given changes in the strength of the received input signal, with the actual changes in plate and grid voltages that can be obtained with the circuit of Fig. 1. More specifically, the curve 58 illustrates the changes in the plate voltage necessary to maintain near peak efficiency of the triode 36 as the strength of the input signal (plotted along the abscissa of the curve) supplied to the triode control grid 40 varies, and curve 60 illustrates the corresponding changes that must be made in the magnitude of the control grid biasing potential in order to keep the amount of distortion at a minimum. It is to be noted that the curves 60 and 62 actually represent the potential of cathode 42 with respect to the potential of grid 40.

With the structure shown in Fig. 1, and with a plate supply voltage whose magnitude varies in accordance with curve 58 it has been found that by properly proportioning the magnitude of the resistors 46 and 54 the magnitude of the grid biasing potential will vary with the plate potential in a manner shown by the dotted curve 62. It can be seen from an examination of Fig. 3 that the curve 62 corresponds quite closely to the curve 60 which, as stated hereinbefore, represents the near ideal curve of control grid biasing potential. The successful operation of the circuit now depends upon the obtaining of a voltage supply source 49 (Fig. 1) capable of producing at the plate 38 of triode 36 a voltage whose magnitude varies in accordance with the curve 58.

Figure 2:
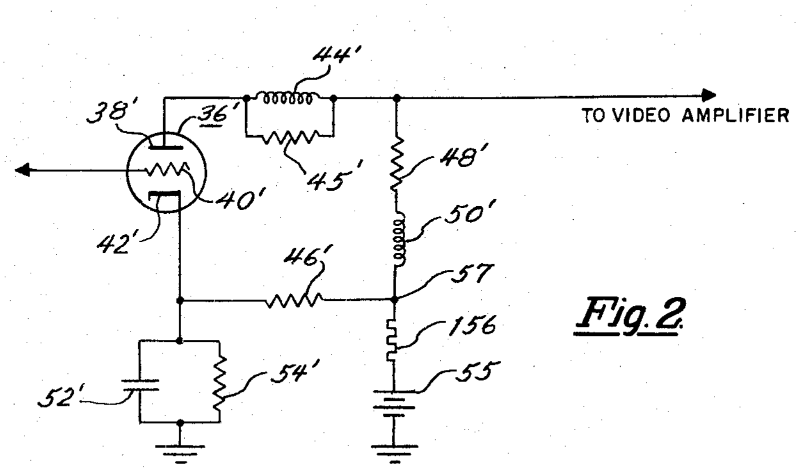
Fig. 2 is a schematic diagram of a specific form of the invention.

Referring now to the circuit of Fig. 2, there is shown a structure which is the same as the structure within the dotted rectangle 24 of Fig. 1, except that instead of the block 49 there is shown specific structure for producing a plate voltage whose magnitude varies in accordance with the curve 58 of Fig. 3. Such specific structure includes a substantially constant D.-C. voltage source 55 and a resisitive element 156 having a negative resistance characteristic, such as a thyrite resistor, for example. Since the current flow through the thermistor is substantially the plate current of the tube 36′, it is apparent that the magnitude of the potential of the point 57 will vary directly with variations in the strength of the input signal supplied to the grid 40′ of the tube 36′. With the proper choice of circuit constants, this rise in the D.-C. potential of the point 57 will exceed the increase in the D.-C. potential drop across the resistor 48′ by amounts sufficient to supply to the plate 38′ of triode 36′ a potential approximately as represented by the curve 58 of Fig. 3. The voltage divider comprised of resistors 46′ and 54′ performs the same function as the corresponding voltage divider shown in Fig. 1; i.e., to vary the cathode 42′ potential in a manner substantially as indicated by the dotted curve 62 of Fig. 3 so as to maintain a minimum of distortion as the plate voltage varies.

Suitable plate voltage supply may be obtained from sources other than a series arrangement of a thermistor and a D.-C. voltage supply. For example, in some television receiver circuits, it is possible to obtain from a point therein, a D.-C. voltage source whose magnitude varies in a suitable manner with changes in the strength of the input signal being detected.

It will be undstood, of course, that in the embodiments of the invention described above, the amount of gain obtained from the triode and the values of the circuit constants will depend to a large extent upon the particular triode employed and the particular circuit constants employed. Typical results that can be obtained are represented by the curve 79 of Fig. 4. The advantages of a triode over a diode, with respect to gain, can readily be seen by comparing the curve 79 with the curve 80, which represent the comparative gains of a circuit employing a triode and a circuit employing a diode, respectively; similar input signals being applied in both cases.

It is to be further understood that various other changes may be made in the circuit arrangement without departing from the spirit or scope of the invention.

I claim:

1. An electronic circuit for the detection and amplification of an applied input signal comprising an electron valve including a cathode, a control grid, and a plate, means for supplying said input signal to said control grid, plate load impedance means, means for producing a plate supply voltage whose magnitude will increase or decrease as the strength of the input signal supplied to the said control grid increases or decreases, and voltage divider means for supplying a portion of said voltage to said cathode, said voltage divider means including a first impedance connected between said cathode and one side of said plate supply voltage means and a second impedance connected between said cathode and the other side of said plate supply voltage means.

2. A detector comprising an electron discharge device including a cathode, a control grid, and a plate, means for supplying an input signal to said control grid, means including the series combination of a first resistor having a negative resistance characteristic and a D.-C. voltage supply constructed and arranged to supply to said plate of said electron discharge device a voltage whose magnitude increases or decreases as the strength of said input signal increases or decreases, and voltage divider means constructed and arranged to supply to said cathode a portion of the voltage appearing across said series combination, said voltage divider means including a second resistor connected between said cathode and said first resistor.

3. A detector circuit comprising a triode including a cathode, a control grid, and a plate, means for supplying an input signal to said control grid, means including the series arrangement of a thermistor and a voltage supply for supplying to the plate of said triode a voltage whose magnitude increases or decreases as the strength of said input signal increases or decreases, and means for supplying a portion of the voltage existing across said series combination to said cathode, said last mentioned means including a resistor connected between said cathode and said thermistor.

4. A detector comprising an electron discharge device including a cathode, a control grid, and a plate, plate load impedance means, means for supplying an input signal to said control grid, means including the series combination of a first resistor having a negative resistance characteristic and a D.-C. voltage supply constructed and arranged to supply to said plate of said electron discharge device through said plate load impedance means a voltage whose magnitude varies as the strength of said input signal, and voltage divider means constructed and arranged to supply to said cathode a portion of the voltage appearing across said series combination, said voltage divider means including a second resistor connected between said cathode and said first resistor.

5. An electronic circuit for the detection and amplification of input signals comprising, an electron valve having an electron emitting electrode, a control electrode, and an electron collecting electrode, means for supplying an input signal to said control electrode, load impedance means for said electron collecting electrode, a variable voltage supply for applying a voltage to said electron collecting electrode which varies in accordance with the strength of said input signal, and a voltage divider circuit connecting said variable voltage supply and said electron emitting electrode for supplying a portion of said voltage to said electron emitting electrode.

6. An electronic circuit for the detection and amplification of input signals, comprising, an electron valve having an electron emitting electrode, a control electrode, and an electron collecting electrode, means for supplying an input signal to said control electrode, load impedance means for said electron collecting electrode, a variable voltage supply for applying a voltage to said electron collecting electrode which varies in accordance with the strength of said input signal, and a voltage divider circuit connecting said variable voltage supply and said electron emitting electrode for supplying a portion of said voltage to said electron emitting electrode said voltage divider including a first resistor connected between said electron emitting electrode and one side of said variable voltage supply and a second resistor connected between said electron emitting electrode and the other side of said variable voltage supply.

References Cited in the file of this patent

UNITED STATES PATENTS

| | | |
|---|---|---|
| 2,021,321 | Miller | Nov. 19, 1935 |
| 2,097,882 | Hudtwalker | Nov. 2, 1937 |
| 2,161,315 | Rechnitzer | June 6, 1939 |